United States Patent [19]

Fukawa et al.

[11] Patent Number: 4,910,074
[45] Date of Patent: Mar. 20, 1990

[54] SAFETY GLASS AND PRELAMINATE THEREFOR

[75] Inventors: Satoru Fukawa; Koji Kurita; Masayuki Miwa, all of Yokohama, Japan

[73] Assignee: Asahi Glass Company Ltd., Tokyo, Japan

[21] Appl. No.: 885,763

[22] Filed: Jul. 15, 1986

[30] Foreign Application Priority Data

Aug. 29, 1985 [JP] Japan .................................. 60-188565

[51] Int. Cl.$^4$ ............................................ B32B 17/10
[52] U.S. Cl. ......................................... 428/215; 428/410; 428/441; 428/442; 428/447; 428/451; 428/458; 428/461; 428/480; 428/483; 428/909; 428/911; 428/913; 428/920; 428/450

[58] Field of Search ............... 428/441, 335, 336, 458, 428/461, 450, 447, 458, 483, 215, 409, 410, 451, 480, 909, 911, 913, 448, 920, 442

[56] References Cited

U.S. PATENT DOCUMENTS

| | | | |
|---|---|---|---|
| 3,666,614 | 5/1972 | Snedeker et al. | 428/442 |
| 4,112,171 | 9/1978 | Motter et al. | 428/451 |
| 4,511,627 | 4/1985 | Tanuma et al. | 428/429 |
| 4,600,627 | 7/1986 | Honda et al. | 428/441 |

Primary Examiner—Pamela R. Schwartz
Attorney, Agent, or Firm—Oblon, Spivak, McClelland, Maier & Neustadt

[57] ABSTRACT

A prelaminate for safety glass comprising a plastic film and an intermediate layer laminated thereon, wherein the intermediate layer is made of a thermosetting or photosetting resin composition comprising an ethylene-vinyl acetate copolymer and a heat curing agent or photosensitizer.

15 Claims, 4 Drawing Sheets

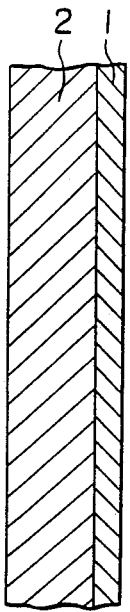
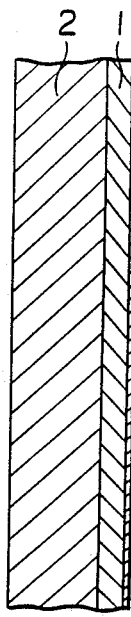
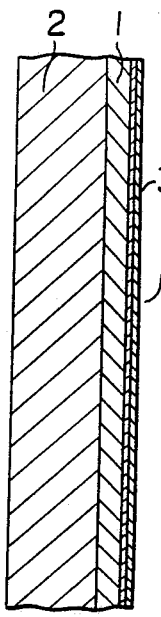
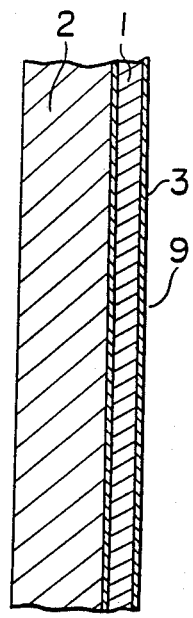
FIGURE 1  FIGURE 2  FIGURE 3  FIGURE 4
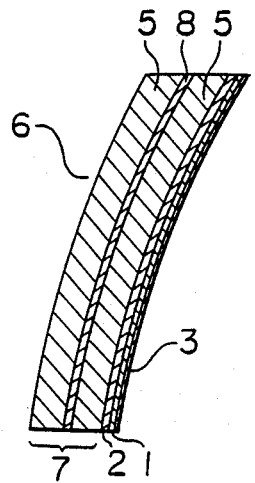
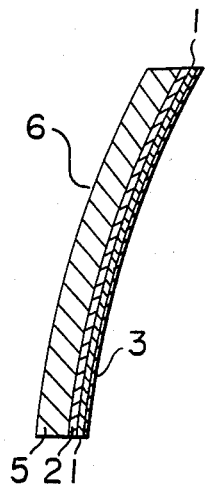
FIGURE 5  FIGURE 6

SAFETY GLASS AND PRELAMINATE THEREFOR

BACKGROUND OF THE INVENTION

1. Field of the Invention

The present invention relates to a safety glass and a prelaminate therefor, which are effective in affording protection against lacerative injuries at the time of collisions and which provide excellent penetration resistance as well as excellent heat resistance, water resistance and optical properties. More particularly, the present invention relates to a safety glass and a prelaminate therefor, which are most suitable for a safety glass for automotive windows.

2. Description of the Prior Art

Laminated glass prepared by laminating and heat-pressing a pair of glass sheets with a polyvinyl butyral layer (hereinafter referred to simply as a "PVB layer") interposed therebetween, has been widely employed for automotive windshields. As an improvement in the safety of such conventional laminated glass, particularly, in the protection against lacerative injuries at the time of collisions, a safety glass comprising a single glass sheet or laminated glass sheet and a plastic film of e.g. polyethylene terephthalate bonded t the interior side of the glass sheet by a PVB layer, is proposed in e.g. U.S. Pat. No. 3,900,673 or 4,469,743. Such a safety glass affords a merit such that since an antilacerative plastic film is provided on the interior side of the safety glass, even when the glass sheet has shattered, it is possible to reduce the danger of the shattered glass pieces injuring the body of the passenger. However, as a result of various tests, the following difficulties have been found. Namely, the safety glass wherein a plastic film is bonded to a glass sheet or laminated glass sheet by means of a PVB layer, has been found to have difficulties such that when it is subjected to a boiling test, foaming takes place in the PVB layer, and when a hard object is pushed against the plastic film surface, a dent is likely to form and remains as a permanent deformation, or that when it is heated, the plastic film surface tends to be uneven, and the optical properties deteriorate. Such difficulties are believed to be attributable to the poor water resistance of the PVB layer and the thermoplasticity of the PVB layer such that it starts to soften at a temperature of about 60° C.

SUMMARY OF THE INVENTION

It is an object of the present invention to provide a safety glass and a prelaminate for the safety glass, which are free from the above-mentioned foaming, dent or surface unevenness due to heating and which have excellent heat resistance, water resistance, fracture resistance, scratch resistance and penetration resistance.

Another object of the present invention is to provide a safety glass and a prelaminate for the safety glass, which have excellent abrasion resistance and wear resistance in addition to the above-mentioned properties.

A further object of the present invention is to provide a safety glass or the prelaminate for the safety glass, which have heat ray reflective properties and/or electric conductivity in addition to the above-mentioned properties.

According to the first aspect, the present invention provides a prelaminate for safety glass comprising a plastic film and an intermediate layer laminated thereon, wherein the intermediate layer is made of a thermosetting or photosetting resin composition comprising an ethylene-vinyl acetate copolymer and a heat curing agent or photosensitizer.

According to the second aspect, the present invention provides a safety glass comprising a glass sheet and a plastic film laminated and bonded to each other with an intermediate layer interposed therebetween, wherein the intermediate layer is made of a thermosetting or photosetting resin composition comprising an ethylene-vinyl acetate copolymer and a heat curing agent or photosensitizer.

Now, the present invention will be described in further detail with reference to the accompanying drawings.

BRIEF DESCRIPTIONS OF THE DRAWINGS

FIGS. 1 to 4 show cross-sectional views of prelaminates for safety glass according to the present invention.

FIGS. 5 to 14 show cross-sectional views of safety glasses according to the present invention.

Figure 7:
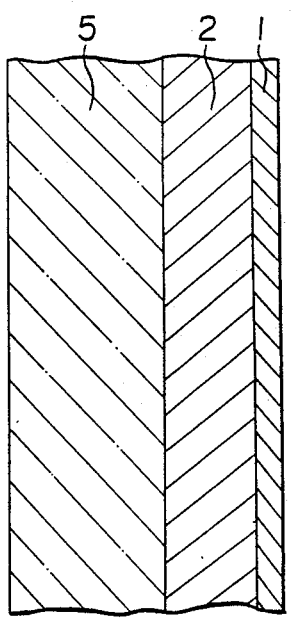
Figure 8:
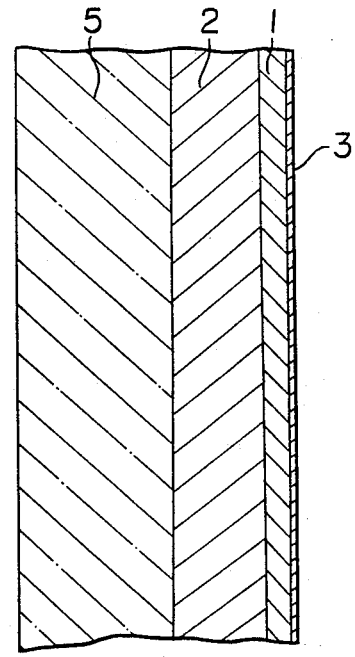
Figure 9:
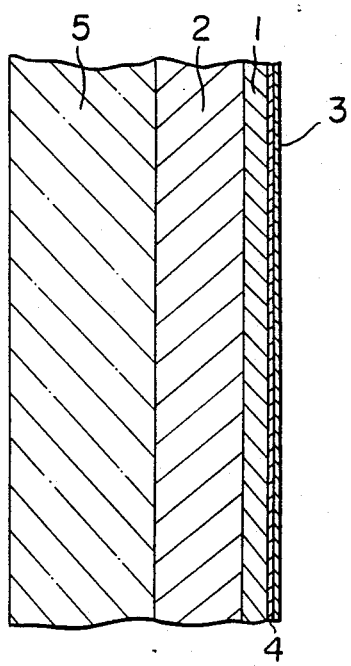
Figure 10:
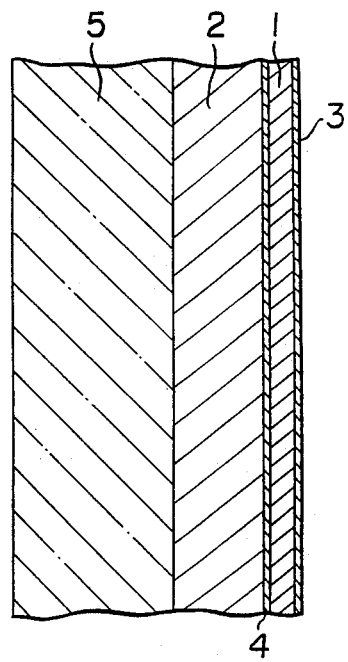
Figure 11:
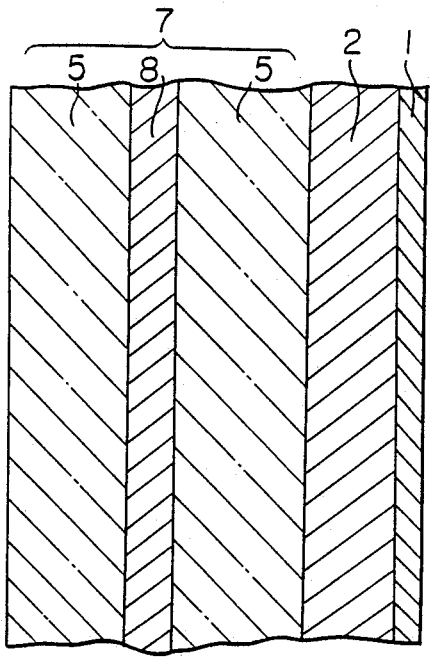
Figure 12:
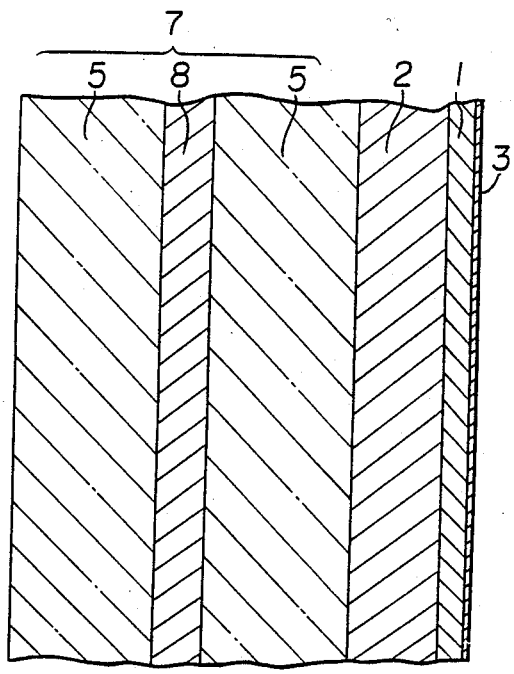
Figure 13:
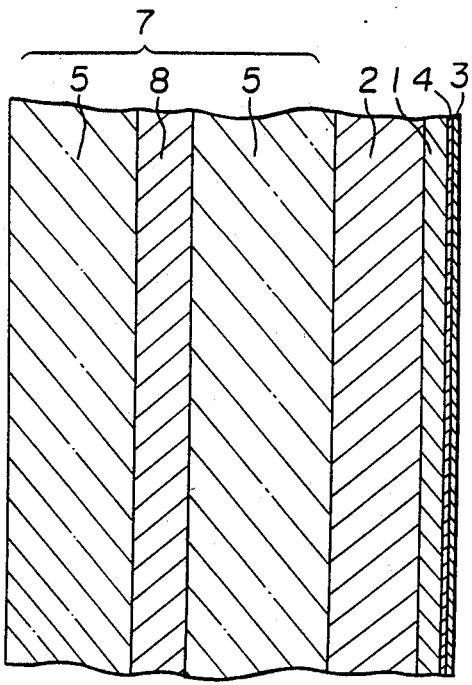
Figure 14:
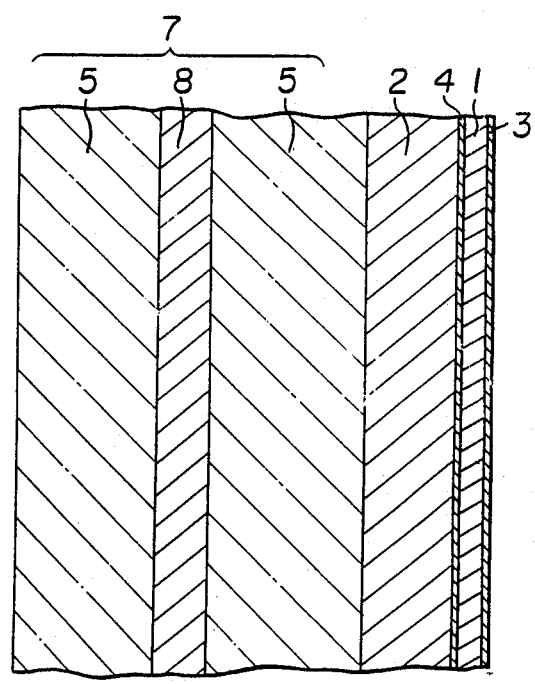

In the drawings, reference numeral 1 indicates plastic film, numeral 2 indicates an EVA resin intermediate layer, numeral 3 indicates a hard surface layer, numeral 4 indicates a heat ray reflective and/or electrically conductive layer (hereinafter referred to as a "heat ray reflective layer"), numeral 5 indicates a glass sheet, numeral 6 indicates a safety glass, numeral 7 indicates a glass sheet for a laminated glass, and numeral 8 indicates an intermediate layer for the laminated glass.

DETAILED DESCRIPTION OF THE PREFERRED EMBODIMENTS

In the present invention, as the plastic film constituting the prelaminate for safety glass, a film having high transparency, excellent surface smoothness, good optical properties and high chemical resistance, is preferably employed, such as a polyethylene terephthalate film, a polycarbonate film, a polyamide film or a polyurethane film. Among them, the polyethylene terephthalane film is most suitable since it has high transparency, no fogging, no substantial optical distortion and proper toughness, and it is durable at a high temperature of from 100° to 150° C. for the lamination to glass sheet. The thickness of such a plastic film is preferably from 50 to 1,000 μm, more preferably from 50 to 500 μm, so that the processing for its lamination to a curved glass sheet can readily be made, and the stiffness is not so high to cause a damage to the head of the passenger but should be adequate not to rupture so easily. For instance, in the case of the polyethylene terephthalate film, the thickness is most preferably from 80 to 200 μm. It is preferred to provide a hard surface layer on such a plastic film at its exposed side to increase the resistance against scratching or abrasion, or to provide a self-healing surface layer to have scratch marks healed. As the former hard surface layer, there may be mentioned, for instance, a hard layer of an organopolysiloxane, an inorganic silica layer, or a composite layer of the inorganic silica and organopolysiloxane. The thickness of the hard surface layer is preferably from 0.5 to 50 μm. As the latter self-healing surface layer, there may be mentioned a thermosetting urethane such as a partially cross-linked aliphatic polyurethane, or a thermoplastic urethane having a certain special treatment applied thereto. In the case of such a urethane film, the thickness is preferably from 10 to 1,000 μm.

The intermediate layer to be used in the present invention is made of a thermosetting or photosetting resin composition comprising an ethylene-vinyl acetate copolymer (EVA) and a heat curing agent such as a peroxide or a photosensitizer blended thereto. The glass sheet and the plastic film are laminated with such an EVA resin intermediate layer interposed therebetween, and then heat or light is applied thereto, if necessary with an application of pressure, to bond the EVA resin intermediate layer to the glass plate and to the plastic film. The amount of vinyl acetate in such an ethylene-vinyl acetate copolymer is preferably from 10 to 50% by weight, more preferably from 15 to 40% by weight. If the amount of vinyl acetate is less than 10% by weight, the transparency tends to be poor, and such an intermediate layer will be unsuitable for a safety glass where transparency is required. On the other hand, if the amount of vinyl acetate exceeds 50%, the strength at rupture tends to be low, and the elongation will be 1,000% or higher, such being unsuitable for an intermediate layer, and it becomes difficult to fabricate such material into an intermediate layer.

The amount of the heat curing agent or photosensitizer to be added to the ethylene-vinyl acetate copolymer, is preferably from 0.2 to 5 parts by weight, relative to 100 parts by weight of the ethylene-vinyl acetate copolymer. As such a heat curing agent, any agent may be employed so long as it generates radicals upon decomposition at a temperature of at least about 90° C. For instance, organic peroxides are employed which include a ketone peroxide such as methyl ethyl peroxide or cyclohexanone peroxide, a hydroperoxide such as t-butyl peroxide or cumene hydroperoxide, a dialkyl peroxide such as di-t-butyl peroxide or ethyl-3,3-di(t-butyl peroxy)butylate, a diacyl peroxide such as acetyl peroxide or propionyl peroxide, and a peroxy ester such as t-butyl peroxy acetate or t-butyl peroxy isobutylate. As the photosensitizer, any photosensitizer may be employed so long as it is capable of generating radicals directly or indirectly when irradiated with light. For instance, there may be employed benzoin, benzophenone, benzoin methyl ether, benzoin ethyl ether, benzoin isopropyl ether, benzoin isobutyl ether, dibenzyl, 5-nitroacetonaphthene, hexachloro cyclopentadiene, p-nitroacetonaphthene, p-nitroaniline, 2,4,6-trinitroaniline, 1,2-benzanthraquinone, or 3-methyl-1,3-diaza-1,9-benzanthrone.

Further, in the EVA resin intermediate layer, it is preferred to incorporate a silane coupling agent in an amount of not higher than 5 parts by weight relative to 100 parts by weight of the ethylene-vinyl acetate copolymer, in order to improve the adhesion of the intermediate layer to the glass plate and to the plastic film. Such a silane coupling agent includes $\gamma$-chloropropyl trimethoxysilane, vinyltrichlorosilane, vinyltriethoxysilane, vinyl-tris($\beta$-methoxy)silane, $\gamma$-methacryloxypropyl methoxysilane, $\beta$-(3,4-ethoxycyclohexyl)ethyltrimethoxysilane, $\gamma$-glycidoxypropyl trimethoxysilane, vinyl-triacetoxysilane, $\gamma$-mercaptopropyl trimethoxysilane and $\gamma$-aminopropyl triethoxysilane.

Further, an acryloxy group or methacryloxy group-containing compound may be added to improve the initial modulus of the ethylene-vinyl acetate resin as the EVA resin intermediate layer of the present invention and thereby to improve the penetration resistance to prevent the penetration of an object when the object collides. As the compound to be used for this purpose, an acrylic acid, or methacrylic acid derivative such as an ester or amide thereof is most common.

Furthermore, a plasticizer, an aging preventive agent, an ultraviolet absorber, a cross-linking assistant or a coloring agent may suitably be incorporated to the ethylene-vinyl acetate copolymer depending upon the particular purpose. The thickness of such an EVA resin intermediate layer is preferably from 0.05 to 2 mm so that when an object collides to the safety glass, the penetration resistance is adequate to prevent the penetration of the object, and at the same time, when the glass sheet shatters, the shattered pieces will be held in the EVA intermediate layer. In order to improve the adhesion to the glass plate, the surface of the EVA resin intermediate layer may be treated for surface roughening by an application of surface roughening treatment such as satinizing. From the viewpoint of penetration resistance and safety upon collision, it is most suitable that such an EVA resin intermediate layer has a tensile strength of from 100 to 500 kg/cm$^2$ and a 100% modulus of from 30 to 100 kg/m$^2$. The above-mentioned values are values after the EVA resin intermediate layer has been cured.

The prelaminate for safety glass according to the present invention is a laminate wherein the above-mentioned plastic film and the EVA resin intermediate layer are laminated and integrated by the adhesion or tackiness of the EVA resin intermediate layer or by heating or press-bonding, whereby the bonding to a glass sheet is facilitated. The overall thickness of such a prelaminate for safety glass is most preferably from 0.1 to 2.5 mm in view of the above-mentioned penetration resistance, impact resistance and impact absorption. Further, on the side of the EVA resin intermediate layer to be bonded with a glass sheet, a silane coupling agent or a primer coating may be applied to improve the adhesion to the glass sheet, as the case requires.

In the present invention, the glass sheet to be laminated with the prelaminate for the safety glass, may be a single sheet glass as shown in FIGS. 6 to 10, or a laminated glass as shown in FIGS. 5 and 11 to 14, wherein a pair of glass sheets are laminated with an intermediate layer of e.g. polyvinyl butyral, polyurethane or an ethylene-vinyl acetate copolymer, interposed therebetween, or may be a multi-layered glass. Such a glass sheet may be flat or curved into a desired configuration. Further, half-reinforcing treatment, entire surface reinforcing treatment or partial reinforcing treatment may be applied as the case requires. Particularly, in the case where a single sheet glass as shown in FIGS. 6 to 10 is used, it is effective to apply reinforcing treatment of a desired degree depending upon the particular purpose. The glass sheet is usually transparent soda lime silicate glass sheet such as a usual glass sheet or a heat ray absorptive glass sheet, which may be produced by a floating method or by various other methods for glass sheets. In the case of a single layer type glass sheet as shown in FIGS. 6 to 10, the thickness is preferably from 2 to 6 mm. Whereas, in the case of a laminated glass type glass sheet as shown in FIGS. 5 and 11 to 14, the thickness is preferably from 3.2 to 7 mm.

If necessary, a heat ray reflective and/or electrically conductive layer may be formed on the plastic film at the exposed side or at the inner side laminated with the EVA resin intermediate layer.

As the heat ray reflective layer to be formed on the plastic film surface, use may be made of a metal oxide coating layer such as a tin oxide layer, a Sb- or F-doped tin oxide layer, an indium oxide layer, a Sn-doped indium oxide layer, a titanium oxide layer, a chromium oxide or cobalt oxide layer, or a metal coating layer such as Ag, Au, Pt, Cu, Al or Cr or a metal coating layer composed mainly of such metals, or an alloy coating layer such as Ni—Cr, Ni—Cr—Fe or Ni—Cu. In the case of the above-mentioned metal coating layers, it is preferred to form a non-absorptive derivative layer such as tin oxide, titanium oxide, indium oxide, zinc oxide, tungsten oxide, aluminum oxide, bismuth oxide or zirconium oxide on the surface of the metal layer in order to improve the durability and the transmittance of visible lights. Alternatively, it is preferred to sandwich the metal layer with a pair of the above-mentioned absorptive derivative layers to form a three-layer system. For instance, typical representatives of heat ray reflective layers capable of providing excellent heat ray reflectivity, durability and high transmittance, include a three-layer structure of titanium oxide/Ag/titanium oxide, a three-layer structure of zinc oxide/Ag/zinc oxide and a three-layer structure of tungsten oxide/Ag/tungsten oxide.

The above-mentioned heat ray reflective coatings represent only typical examples. It is further possible to increase the number of layers in the multi-layer structure, to form a multi-layer structure from different types of layers, to fabricate a composite layer structure or to select heat ray reflective layers made of other substances.

Among the above-mentioned heat ray reflective layers, many have electric conductivity, and they may be used as conductive coatings to be electrically heated or as antenna coatings for receiving radio waves such as radios or televisions. Otherwise, these layers may be employed as conductive coatings for electromagnetic wave shielding. For instance, a Sb- or F-doped tin oxide layer, a Sn-doped indium oxide layer or a multi-layer coating containing such a layer, or a three-layer structure of titanium oxide/Ag/titanium oxide, zinc oxide/Ag/zinc oxide or tungsten oxide/Ag/tungsten oxide, is useful as the electrically conductive layer. Of course, such a layer may be employed for a safety glass provided with a heat ray reflective function, electrically heating function, antenna function and electromagnetic wave shielding function simultaneously.

The heat ray reflective layer is formed on the plastic film preferably at its side laminated with the intermediate layer, with a view to prevention of the deterioration due to the moisture.

Further, a transparent color layer, a non-transparent color layer, a conductive printed line for electrical heating, an antenna line, etc. may be formed on the above-mentioned glass sheet partially or entirely over the surface, as the case requires. Further, the glass sheet may be treated for decoration, or various other treatments may be applied thereto.

As typical examples for the production of the safety glass of the present invention, there may be mentioned a method wherein the prelaminate for safety glass of the present invention is laid on a glass sheet, or a glass sheet, the EVA resin intermediate layer and the plastic film are sequentially laid, or a cover glass sheet is further laid on the plastic film; then the assembly is placed in a vacuum bag, and the vacuum bag is evacuated for preliminary press-bonding; the preliminarily press-bonded laminate is heated to a temperature higher than the melting point of the crystal of the ethylene-vinyl acetate copolymer, e.g. to a temperature of from 60° to 160° C., and maintained at that temperature for e.g. from ten minutes to one hour (if necessary, under pressure) to cross-link the ethylene-vinyl acetate copolymer and to integrally bond the glass sheet, the EVA resin intermediate layer and the plastic film; or a method wherein in the case of using an EVA resin intermediate layer containing a photosensitizer, a laminate of the glass sheet, the EVA resin intermediate layer and the plastic film, is placed in a vacuum bag, and the vacuum bag is evacuated for preliminary press-bonding; and then light is irradiated to the preliminarily press-bonded laminate, or in some cases, the irradiation of light and heating are applied to the laminate, to cure the intermediate layer. As the light source for the above photocuring, a light source capable of emitting a light within a ultraviolet to visible ray region may be employed, such as, a ultrahigh pressure mercury lamp, a high pressure mercury lamp, a low pressure mercury lamp, a chemical lamp, a xenon lamp, a halogen lamp, a mercury xenon lamp, a carbon arc lamp, sun light of an incandescent lamp. The irradiation time may vary depending upon the type of the lamp and the intensity of the light source. However, it is usually from a few tens seconds to a few tens minutes.

In the safety glass of the present invention, the rubber hardness of, the plastic film surface is preferably within a range of from 98.0 to 100 in order to avoid a pressing deformation.or a deformation to be caused by vacuum sucking disks used for transportation or handling. If the rubber hardness is less than 98.0, the hardness tends to be inadequate, whereby the film surface is susceptible to a pressing deformation or a deformation due to the vacuum sucking disks. For instance, a safety glass prepared by laminating a plastic film and a glass sheet by means of a polyvinyl butyral film, such as the one presented in Example 9, has a rubber hardness of 97.0 at the plastic film side, and is susceptible to a pressing deformation or a deformation due to the vacuum sucking disks.

Now, the present invention will be described in further detail with reference to Examples. However, it should be understood that the present invention is by no means restricted to these specific Examples.

EXAMPLE 1

A prelaminate for safety glass comprising a polyethylene terephthalate film (thickness: 125 μm, manufactured by Teijin Ltd.) and EVA resin intermediate layer No. 1 in Table 1 (thickness: 0.5 mm), was laid on a float glass sheet (non-reinforced product, thickness: 3 mm). Further, a cover glass sheet (thickness: 2 mm) was laid on the plastic film of the prelaminate for safety glass. The assembly was placed in a vacuum bag for preliminary press-bonding, then evacuated to a reduced pressure of 10 mmHg, and maintained at 80° C. for 10 minutes for preliminary press-bonding. Then, the preliminarily press-bonded assembly was placed in an autoclave and subjected to the main press-bonding at 145° C. under a pressure of 15 atm for 30 minutes. The press-bonded product was taken out from the autoclave. Then, the laminate was taken out from the vacuum bag, and at the same time, the cover glass sheet was removed to obtain a safety glass of Sample 1. Sample 1 was tested for its properties. The results are shown in Table 2.

EXAMPLE 2

A prelaminate for safety glass comprising a polyethylene terephthalate film ("Toughtop" tradename, manufactured by Toray Industries Inc., thickness: 100 μm)

having a polysiloxane type hard surface layer (thickness: 5 μm) formed on its surface and EVA resin intermediate layer No. 2 in Table 1 (thickness: 0.2 mm), was laid on a usual laminated glass prepared by heat-bonding a pair of glass sheets having a thickness of 2.3 mm with an intermediate layer of polyvinyl butyral having a thickness of 0.78 mm interposed therebetween. Further, a cover glass sheet (thickness: 2 mm) was laid on the plastic film in the above prelaminate for safety glass. The assembly was placed in a vacuum bag for preliminary press-bonding, then evacuated to a reduced pressure of 10 mmHg, and maintained at 80° C. for 10 minutes for preliminary press-bonding. Then, the preliminarily press-bonded assembly was placed in an autoclave and subjected to the main press-bonding at 130° C. under a pressure of 15 atm for 30 minutes. The laminate was taken out from the autoclave, and the cover glass sheet was removed from the laminate to obtain a safety glass of Sample 2. Sample 2 was tested for its properties. The results are shown in Table 2.

EXAMPLE 3

A prelaminate for safety glass comprising a polyethylene terephthalate film ("Toughtop" tradename, manufactured by Toray Industries Ltd., thickness: 100 μm) having a polysiloxane type hard surface layer (thickness: 5 μm) formed on its surface and EVA resin intermediate layer No. 3 in Table 1 (thickness: 0.2 mm), was laid on a usual laminated glass prepared by heat-bonding a pair of glass sheets having a thickness of 2.3 mm with an intermediate layer of polyvinyl butyral having a thickness of 0.78 mm interposed therebetween. Further, a cover glass sheet (thickness: 2 mm) was laid on the plastic film of the above prelaminate for safety glass. The assembly was placed in a vacuum bag for preliminary press-bonding, then evacuated to a reduced pressure of 10 mmHg, and maintained at 80° C. for 10 minutes for preliminary press-bonding. Then, the preliminarily press-bonded assembly was placed in an autoclave and subjected to the main press-bonding at 145° C. under a pressure of 15 atm for 30 minutes. The laminate thereby obtained was taken out from the autoclave, and the cover glass sheet was removed from the laminate to obtain a safety glass of Sample 3. The Sample 3 was tested for its properties. The results are shown in Table 2.

EXAMPLE 4

A prelaminate for safety glass comprising a polyethylene terephthalate film ("Toughtop" tradename, manufactured by Toray Industries Ltd., thickness: 100 μm) having a polysiloxane type hard surface layer (thickness: 5 μm) formed on its surface and EVA No. 4 in Table 1 (thickness: 0.2 mm), was laid on a usual laminated glass prepared by heat-bonding a pair of glass sheets having a thickness of 2.3 mm with an intermediate layer of polyvinyl butyral having a thickness of 0.78 mm interposed therebetween. Further, a cover glass sheet (thickness: 2 mm) was laid on the plastic film of the above prelaminate for safety glass. The assembly was placed in a vacuum bag for preliminary press-bonding, then evacuated to a reduced pressure of 10 mmHg, and maintained at 80° C. for 10 minutes for preliminary press-bonding. Then, the preliminarily press-bonded assembly was taken out from the vacuum bag, and immediately after removing the cover glass sheet, was irradiated with ultraviolet rays from a distance of 15 cm by a ultraviolet radiation apparatus of 4 KW for 30 seconds for each side i.e. a total of one minute to conduct the main press-bonding. Sample 4 thus obtained was tested for its properties. The results are shown in Table 2.

EXAMPLE 5

A prelaminate for safety glass comprising a bi-axially stretched polyethylene terephthalate film (manufactured by Teijin Ltd., thickness: 125 μm) having a polysiloxane type hard surface layer (thickness: 4 μm) formed on its outer surface and a $TiO_2/Ag/TiO_2$ heat ray reflective layer formed on the inner lamination side surface and EVA resin interlayer No. 1 in Table 1 (thickness: 0.5 mm) was laid on a float glass sheet (non-reinforced product, thickness: 3 mm). Further, a cover glass sheet (thickness: 2 mm) was laid on the plastic film of the above prelaminate for safety glass. The assembly was placed in a vacuum bag for preliminary press-bonding, evacuated to a reduced pressure of 10 mmHg, and maintained at 100° C. for 10 minutes for preliminary press-bonding. Then, the preliminarily press-bonded assembly was placed in an autoclave, and subjected to the main press-bonding at 145° C. under a pressure of 15 atm for 30 minutes. The product was taken out from the autoclave. The laminate thus obtained was taken out from the vacuum bag, and at the same time, the cover glass sheet was removed therefrom to obtain a safety glass of Sample 5. Sample 5 was tested for its properties. The results are shown in Table 2.

EXAMPLE 6

A prelaminate for safety glass comprising a bi-axially stretched polyethylene terephthalate film (thickness: 100 μm) having a polysiloxane type hard surface layer (thickness: 4 μm) formed on its outer surface and a three-layer structured heat ray reflective layer of $TiO_2(250Å)/Ag(100Å)/TiO_2(250Å)$ formed on the inner lamination side surface and EVA intermediate layer No. 2 in Table 1 (thickness: 0.2 mm), was laid on a usual laminated glass prepared by heat-pressing a pair of glass sheets having a thickness of 2.3 mm with an intermediate layer of polyvinyl butyral having a thickness of 0.78 mm interposed therebetween. Further, a cover glass sheet (thickness: 2 mm) was laid on the plastic film of the above prelaminate for safety glass. The assembly was placed in a vacuum bag for preliminary press-bonding, then evacuated to a reduced pressure of 10 mmHg, and maintained at 100° C. for 10 minutes for preliminary press-bonding. Then, the preliminarily press-bonded assembly was placed in an autoclave, and subjected to the main press-bonding at 130° C. under a pressure of 15 atm for 30 minutes. The laminate thus obtained was taken out from the autoclave, and the cover glass sheet was removed therefrom to obtain a safety glass of Sample 6. Sample 6 was tested for its properties. The results are shown in Table 2.

EXAMPLE 7

A prelaminate for safety glass comprising a bi-axially stretched polyethylene terephthalate film ("Toughtop" tradename, manufactured by Toray Industries Ltd., thickness: 100 μm) having a polysiloxane type hard surface layer (thickness: 5 μm) formed on its outer surface and an electrically conductive heat ray reflective layer of $TiO_2/Ag/TiO_2$ formed on the inner lamination side surface and EVA resin intermediate layer No. 3 in Table 1 (thickness: 0.2 mm), was laid on a usual laminated glass prepared by heat-pressing a pair of glass sheets having a thickness of 2.3 mm with an intermediate layer of polyvinyl butyral having a thickness of 0.78 mm interposed therebetween. Further, a cover glass sheet (thickness: 2 mm) was laid on the plastic film of the above prelaminate for safety glass. The assembly was placed in a vacuum bag for preliminary press-bonding, then evacuated to a reduced pressure of 10 mmHg, and maintained at 100° C. for 10 minutes for preliminary press-bonding. Then, the preliminarily press-bonded assembly was placed in an autoclave, and subjected to the main press-bonding at 145° C. under a pressure of 15 atm for 30 minutes. The laminate thus obtained was taken out from the autoclave, and the cover glass sheet was removed therefrom to obtain a safety glass of Sample 7. Sample 7 was tested for its properties. The results are shown in Table 2.

COMPARATIVE EXAMPLE 1

A safety glass was prepared in the same manner as in Example 2 except that EVA resin intermediate layer No. 5 in Table 1 (thickness: 0.2 mm) was used instead of the EVA intermediate layer No. 2 used in Example 2. The safety glass (Sample 9) was tested for its properties. The results are shown in Table 2.

COMPARATIVE EXAMPLE 2

A safety glass was prepared in the same manner as in Example 2 except that a polyvinyl butyral intermediate layer ("Butasite" tradename, manufactured by Du Pont Company, thickness: 0.36 mm) was used instead of the EVA resin intermediate layer No. 2 in Example 2. The safety glass (Sample 10) was tested for its properties. The results are shown in Table 2.

TABLE 1

| No. | Composition of EVA resin intermediate layer ||||
|---|---|---|---|---|
| | Type of EVA | Photo-sensitizer | Curing agent | Silane coupling agent |
| No. 1 (Present invention) | EVA containing 14 wt. % of vinyl acetate (100 parts by weight) | — | Dicumyl peroxide ether (1 part by weight) | γ-glycidylmethoxy trimethylsilane (0.5 part by weight) |
| No. 2 (Present invention) | EVA containing 19 wt. % of vinyl acetate (100 parts by weight) | — | Dicumyl peroxide ether (1 part by weight) | γ-glycidylmethoxy trimethylsilane (0.5 part by weight) |
| No. 3 (Present invention) | EVA containing 28 wt. % of vinyl acetate (100 parts by weight) | — | Dicumyl peroxide ether (1 part by weight) | γ-glycidylmethoxy trimethylsilane (0.5 part by weight) |
| No. 4 (Present invention) | EVA containing 33 wt. % of vinyl acetate (100 parts by weight) | Benzoin isopropyl ether (1 part by weight) | — | γ-glycidylmethoxy trimethylsilane (0.5 part by weight) |
| No. 5 (Comparative Example) | EVA containing 28 wt. % of vinyl acetate (100 parts by weight) | — | — | — |

EXAMPLE 8

A prelaminate for safety glass comprising a polyethylene terephthalate film (thickness: 100 μm) having a polysiloxane type hard surface layer (thickness: 5 μm) formed on its outer surface and an electrically conductive heat ray reflective layer of $TiO_2/Ag/TiO_2$ formed on the inner lamination side surface and EVA resin intermediate layer No. 4 in Table 1 (thickness: 0.2 mm), was laid on a usual laminated glass prepared by heat-pressing a pair of glass sheets having a thickness of 2.3 mm with an intermediate layer of polyvinyl butyral having a thickness of 0.78 mm interposed therebetween. Further, a cover glass sheet (thickness: 2 mm) was laid on the plastic film of the above prelaminate for safety glass. The assembly was placed in a vacuum bag for preliminary press-bonding, then evacuated to a reduced pressure of 10 mmHg, and maintained at 100° C. for 10 minutes for preliminary press-bonding. Then, the preliminarily press-bonded assembly was taken out from the vacuum bag and immediately after removing the cover glass sheet, subjected to the main press-bonding by irradiating ultraviolet rays from a distance of 15 cm for 30 seconds for each side i.e. a total of 1 minute by means of a UV radiation apparatus of 4 KW. Sample 8 thus obtained was tested for its properties. The results are shown in Table 2.

EXAMPLE 9

Sample 2 i.e. the safety glass of the present invention obtained in Example 2 and Sample 10 obtained in Comparative Example 2, were subjected to sucking tests by means of sucking disks.

In the sucking tests, the plastic film surface of each sample was sucked with a sucking disk (diameter: 10 cm) at a sucking pressure of 500 mmHg at the temperature of the glass sheet being 20° C. or 40° C. for 1.5 minutes or 30 minutes, and the period of the time after the release of the sucking until the mark of the sucking disk disappeared, was measured.

As shown in Table 3, no mark of the sucking disk remained on Sample 2. Whereas, in the case of Sample 10, the mark of the sucking disk remained, and it took from 30 minutes to 22 days for recovery as shown in Table 3.

TABLE 3

| | Sucking temperature (glass sheet temp.) ||||
|---|---|---|---|---|
| | 20° C. || 40° C. ||
| | Sucking time ||||
| Sample | 1.5 min. | 30 min. | 1.5 min | 30 min |
| Sample 2 | 0 sec. | 0 sec | 0 sec. | 0 sec. |
| Sample 3 | 30 min. | 5 hr. | 5 hr. | 22 days |

Rubber Hardness Test

The rubber hardness of the plastic film surface of each sample was measured by means of a rubber hardness tester disclosed in JIS K-6301. By this test, the strength of the plastic film surface of each sample against the pressing deformation can be determined.

Samples 1 to 8 of the present invention showed rubber hardness higher by 2.5° than Samples 9 and 10 of the Comparative Examples, thus indicating high resistance against the pressing deformation.

Labeling Test

An automobile inspection label (size: about 5×5 cm) was attached on the plastic film surface of each sample, and ten days later, the label was peeled off.

With respect to Samples 1 to 8 of the present invention, no distortion was observed on the surface of each plastic film from which the label was peeled off. Whereas, in the cases of Samples 9 and 10 of the Comparative Examples, the irregularities of the label were impressed on the surface of each plastic film from which the label was peeled off, and the irregularities did not disappear.

TABLE 2

| | Example 1 | Example 2 | Example 3 | Example 4 | Example 5 | Example 6 | Example 7 | Example 8 | Comparative Example 1 (Example 9) | Comparative Example 2 (Example 10) |
|---|---|---|---|---|---|---|---|---|---|---|
| Penetration test[1] | O | O | O | O | O | O | O | O | O | O |
| Impact resistance test[2] | O | O | O | O | O | O | O | O | O | O |
| Heat resistance test (boiling)[3] | O | O | O | O | O | O | O | O | X Irregularities formed on the surface | X Irregularities formed on the surface |
| Light resistance test[4] | O | O | O | O | O | O | O | O | O | O |
| Humidity resistance test[5] | O | O | O | O | O | O | O | O | O | O |
| Hot air test[6] | O | O | O | O | O | O | O | O | X Irregularities formed on the surface | X Irregularities formed on the surface |
| Haze | O | O | O | O | O | O | O | O | O | O |
| Taper abrasion | O | O | O | O | O | O | O | O | Δ | O |
| Pencil pressing deformation test | O | O | O | O | O | O | O | O | X Permanent deformation | X Permanent deformation |
| Rubber hardness test | 98.0° | 99.5° | 99.5° | 99.5° | 98.0° | 99.5° | 99.5° | 99.5° | 97.0° | 97.0° |
| Labeling test | No distortion on the plastic film surface | No distortion on the plastic film surface | No distortion on the plastic film surface | No distortion on the plastic film surface | No distortion on the plastic film surface | No distortion on the plastic film surface | No distortion on the plastic film surface | No distortion on the plastic film surface | Irregularities of the label remained on the plastic film surface | Irregularities of the label remained on the plastic film surface |
| Optical distortion | O | O | O | O | O | O | O | O | O | O |
| Visible ray transmittance | 78% | 84% | 84% | 84% | 73% | 72% | 72% | 72% | 83% | 83% |
| Near infrared transmittance | — | — | — | — | 40% | 38% | 38% | 38% | — | — |
| Near infrared reflectance | — | — | — | — | 20% | 20% | 20% | 20% | — | — |
| Electric conductivity | — | — | — | — | O | O | O | O | — | — |

O: Good; Δ: Fair; X: Bad
[1]Penetration test: A steel ball of 2.26 kg was dropped on the plastic film side from a height of 4 m.
[2]Impact resistance test: A steel ball of 227 g was dropped on the glass sheet side from a height of 9 m.
[3]Heat resistance test (boiling): The sample was immersed in a boiling water of 100° C. for 2 hours.
[4]Light resistance test: Ultraviolet rays were irradiated for 100 hours.
[5]Humidity resistance test: The sample was held at 50° C. under a relative humidity of 95% for 2 hours.
[6]Hot air test: A hot air of 80° C. was blown to the sample for 10 minutes from a distance of 10 cm.

EXAMPLE 10

Samples of EVA resin intermediate layer No. 3 in Table 1 (i.e. a laminate comprising ten sheets each having a thickness of 0.2 mm and a size of 30×30 mm, and having a weight of about 5 g) were heated at 120° C., 130° C., 140° C. and 150° C., respectively, for curing, whereby cure torques were measured by a curelastometer (JSR curelasto-meter model III). The curing curves thereby obtained are shown in FIG. 15.

Figure 15:
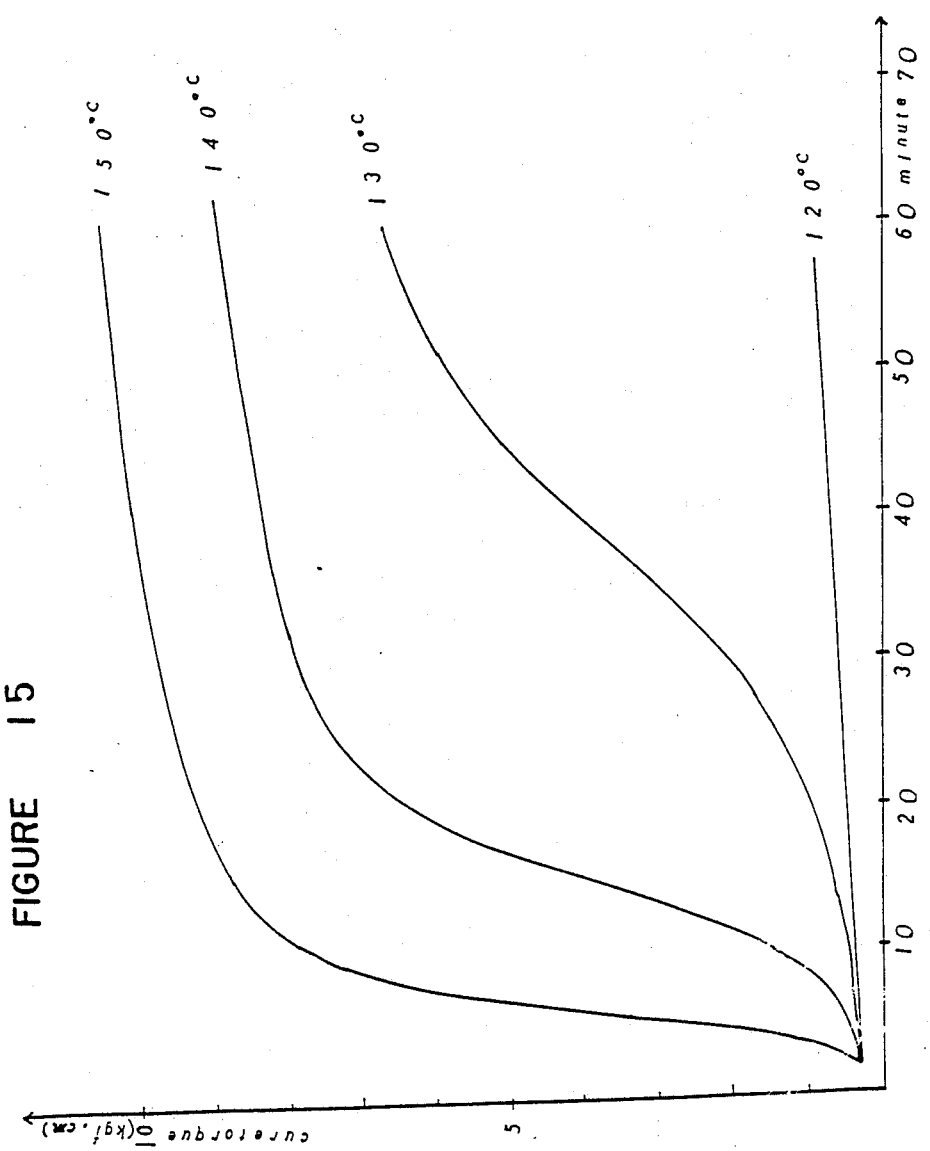
FIG. 15 is a graph illustrating the curing curves of samples of Example 10 at various temperatures.

It is evident from FIG. 15 that no adequate cross-linking was obtained at a temperature of 120° or 130° C., and the EVA resin intermediate layer still showed thermoplasticity (i.e. low cure torque). Whereas, adequate cross-linking took place at temperatures of 140° and 150° C., whereby high cure torques were obtained. Thus, from the test results of these samples, it is evident that the EVA laminated intermediate layer shows thermosetting when heated at a temperature of about 135° C. or higher.

In the cross-linked EVA resin laminated intermediate layer according to the present invention, the cure torque representing the thermosetting property is preferably within a range of from 7 to 12 kgf.cm, more preferably from 8 to 10 kgf.cm.

If the cure torque is less than 7 kgf.cm, a pressing deformation or a deformation due to vacuum sucking disks is likely to form, such being undesirable. On the other hand, if the cure torque exceeds 12 kgf.cm, the EVA resin intermediate layer tends to be too hard, whereby the adhesion to the glass tends to decrease.

As is evident from the foregoing Examples and Comparative Examples, in safety glasses wherein a glass sheet and a plastic film are bonded with a polyvinyl butyral intermediate layer or a conventional ethylene-vinyl acetate intermediate layer, foaming was observed in the intermediate layer by the heat resistance test, and irregularities formed on the plastic film surface, whereas in the safety glasses of the present invention, no foaming was observed in the intermediate layer, and no irregularities formed on the plastic film surface. Further, in the safety glasses wherein the glass sheet and the plastic film are bonded by the polyvinyl butyral intermediate layer or the conventional ethylene-vinyl acetate copolymer intermediate layer, a dent deformation mark remained when the surface was moderately pressed by a finger nail, whereas in the safety glasses of the present invention, such a deformation mark little remained.

The EVA resin intermediate layer of the present invention shows a thermoplasticity prior to the curing, and therefore its lamination to the glass plate is easy, and a processing such as the preliminary press-bonding is easy. However, once heat curing treatment or hot curing treatment is applied, the curing of the EVA resin intermediate layer proceeds, and the intermediate layer tends to have the properties of a thermosetting resin, and the thermoplastic properties tend to decrease, whereby the formation of a deformation mark due to pressing can be minimized as mentioned above. The decrease of the foaming of the safety glasses of the present invention is believed to be attributable to the humidity resistance of the EVA intermediate layer itself and to the fact that due to the curing treatment, the curing of the EVA resin intermediate layer proceeds, whereby the humidity resistance and heat resistance increase. Further, the safety glasses of the present invention have adequate impact resistance, and they are free from forming white turbidity due to the high humidity resistance. Furthermore, there is no decrease in the adhesive strength, and there is no substantial deterioration in the impact rupture resistance, particularly the penetration resistance at low temperatures. Furthermore, when the laminated glass is shattered by an impact, no peeling takes place as between the intermediate layer and the glass sheet, whereby the scattering of the shattered glass pieces can be prevented to a large extent.

Heat ray reflective properties and/or electric conductivity can be imparted to the safety glasses and the prelaminates for safety glass according to the present invention. Further, in the safety glasses of the present invention having such a heat ray reflective and/or electrically conductive layer formed thereon, even after they are subjected to tee humidity resistance test and heat resistance test, the prelaminates for safety glass according to the present invention still have adequate humidity resistance and heat resistance, whereby the possibility of color change of the coating layer can be minimized.

The safety glasses of the present invention are most suitable for window glass sheets for automobiles, etc., or for window glass sheets of buildings to which the human bodies are likely to collide. The safety glasses of the present invention are arranged so that the plastic film side is located inside of the car and the glass sheet is located outside the car, whereby the lacerative injuries or cerebral damages of the passengers at the time of collisions can be reduced, and a high level of safety is obtainable.

What is claimed is:

1. A safety glass consisting essentially of a laminate having a glass sheet bonded to only one side thereof, wherein said laminate comprises a plastic film and an intermediate layer, and wherein said intermediate layer consists of a thermosetting or a photosetting resin composition, said resin composition consisting essentially of an ethylene-vinyl acetate copolymer wherein said ethylene-vinyl acetate copolymer contains from 10–50% by weight vinyl acetate, and a heat curing agent or photosensitizer, wherein said laminate does not contain a glass sheet, and wherein the surface of said plastic film has a rubber hardness in a range from 98.0 to 100.

2. The safety glass according to claim 1, wherein the glass sheet is selected from the group consisting of a non-tempered glass sheet, a tempered glass sheet, a partially tempered glass sheet, and a combination thereof.

3. The safety glass according to claim 1, wherein the plastic film is a polyethylene terephtalate film.

4. The safety glass according to claim 1, wherein a heat ray reflective coating is provided on the plastic film at the side laminated with the intermediate layer.

5. The safety glass according to claim 1, wherein an electrically conductive layer is provided on the plastic film on the side laminated with the intermediate layer.

6. The safety glass according to claim 1, wherein the curing agent in the intermediate layer is a peroxide.

7. The safety glass according to claim 1, wherein the intermediate layer has a thickness of from 0.05 to 2 mm.

8. The safety glass according to claim 1, wherein the plastic film has a thickness of from 0.05 to 1.0 mm.

9. The safety glass according to claim 1 wherein the glass sheet is a laminated glass sheet.

10. A safety glass consisting essentially of a laminate having a glass sheet bonded to only one side thereof, wherein said laminate comprises a plastic film and an intermediate layer, and wherein said intermediate layer consists of a thermosetting or photosetting resin composition, said resin composition consisting essentially of an ethylene-vinyl acetate copolymer, wherein said ethylene-vinyl acetate copolymer contains from 14-40% by weight vinyl acetate, and a heat curing agent or photosensitizer, wherein said laminate does not contain a glass sheet, the surface of said plastic film has a rubber hardness in the range from 98.0-100, and wherein a hard surface layer comprising an organopolysiloxane, inorganic silica, or a composite of inorganic silica and an organopolysiloxane, said hard surface layer having a thickness between about 0.5-50 microns is provided on the plastic film at the side opposite to the intermediate layer.

11. The safety glass according to claim 10, wherein a heat ray reflective layer is provided on the plastic film at the side opposite to the intermediate layer, and a hard surface layer comprising an organopolysiloxane, inorganic silica, or a composite of inorganic silica and an organopolysiloxane, said hard surface layer having a thickness between about 0.5-50 microns is provided on the heat ray reflective layer.

12. The safety glass of claim 11, wherein said hard surface layer comprises an organopolysiloxane.

13. The safety glass according to claim 10, wherein an electrically conductive layer is provided on the plastic film at the side opposite to the intermediate layer, and a hard surface layer comprising an organopolysiloxane, inorganic silica, or a composite of inorganic silica and an organopolysiloxane, said hard surface layer having a thickness of between about 0.5-50 microns is provided on the conductive layer.

14. The safety glass according to claim 13, wherein said hard surface layer comprises an organopolysiloxane.

15. The safety glass of claim 10, wherein said hard surface layer comprises an organopolysiloxane.

* * * * *